(12) United States Patent
Giannetti

(10) Patent No.: US 7,762,166 B2
(45) Date of Patent: Jul. 27, 2010

(54) MULTIPLE MACHINE TOOL SUPPORT BLOCK AND TOOL POST HAVING INTERNAL COOLANT SUPPLY

(76) Inventor: Enrico R. Giannetti, 650 County Road 219, East Bernard, TX (US) 77435

( * ) Notice: Subject to any disclaimer, the term of this patent is extended or adjusted under 35 U.S.C. 154(b) by 820 days.

(21) Appl. No.: 11/712,115

(22) Filed: Feb. 28, 2007

(65) Prior Publication Data
US 2008/0206004 A1    Aug. 28, 2008

(51) Int. Cl.
*B23B 3/20* (2006.01)
*B23P 15/28* (2006.01)

(52) U.S. Cl. ............................................. 82/50; 407/11
(58) Field of Classification Search ............... 82/50, 82/117, 130, 157–159, 163, 901; 407/11, 407/41, 108; 408/56–58
See application file for complete search history.

(56) References Cited

U.S. PATENT DOCUMENTS

| | | | |
|---|---|---|---|
| 487,847 A * | 12/1892 | Le Vesconte | 408/60 |
| 1,359,955 A * | 11/1920 | Bernay | 408/57 |
| 3,242,819 A * | 3/1966 | Erikson | 409/233 |
| 3,375,742 A * | 4/1968 | Sturm | 82/159 |
| 3,798,726 A * | 3/1974 | Dudley | 407/11 |
| 3,893,355 A * | 7/1975 | Maastricht | 82/137 |
| 4,305,540 A * | 12/1981 | Olson | 227/61 |
| 4,404,728 A * | 9/1983 | Ishikawa | 483/13 |
| 4,442,576 A * | 4/1984 | Kitamura | 29/39 |
| 4,524,655 A * | 6/1985 | Waldron et al. | 82/159 |
| 4,552,495 A * | 11/1985 | Malzkorn | 409/136 |
| 4,557,643 A * | 12/1985 | Cioci | 409/136 |
| 4,573,836 A * | 3/1986 | Andersson | 408/59 |
| 4,604,787 A * | 8/1986 | Silvers, Jr. | 483/55 |
| 4,624,043 A * | 11/1986 | Bennett | 483/55 |
| 4,643,056 A * | 2/1987 | Arehart et al. | 82/159 |
| 4,697,741 A * | 10/1987 | Dengler et al. | 239/391 |
| 4,706,373 A * | 11/1987 | Andriussi | 483/7 |
| 4,708,538 A * | 11/1987 | Kubo et al. | 408/59 |
| 5,209,147 A * | 5/1993 | Hawkins et al. | 82/161 |
| 5,265,505 A * | 11/1993 | Frechette | 82/159 |
| 5,535,496 A * | 7/1996 | Sugino et al. | 29/39 |
| 5,564,168 A * | 10/1996 | Hostert et al. | 29/50 |
| 5,735,782 A * | 4/1998 | Berg | 483/1 |
| 6,039,517 A * | 3/2000 | Charewicz | 409/135 |
| 6,497,020 B2 * | 12/2002 | Forst | 29/40 |
| 6,564,682 B1 * | 5/2003 | Zurecki et al. | 82/50 |
| 7,144,207 B2 * | 12/2006 | Weigel | 408/56 |
| 7,172,542 B2 * | 2/2007 | Sato et al. | 483/1 |
| 7,241,087 B2 * | 7/2007 | Agehara et al. | 408/204 |

* cited by examiner

*Primary Examiner*—Will Fridie, Jr.
(74) *Attorney, Agent, or Firm*—James L. Jackson

(57) ABSTRACT

A coolant fluid supplying tool post is mounted to a machining system for machine controlled movement and has an internal coolant passage system, a coolant fluid inlet, a coolant fluid outlet and a first dove-tail mount. A multiple machine tool support block has a second dove-tail mount is in supported engagement with the first dove-tail mount. A plurality of machine tool receptacles are defined in the multiple machine tool support block and each is adapted for support of a machine tool therein. Tool retainer members are carried by the multiple machine tool support block for each of the machine tool receptacles and has retaining engagement with a machine tool located within a machine tool receptacle. Coolant passages within the multiple machine tool support block have a coolant supply inlet in fluid communication with the coolant fluid outlet of the coolant fluid supplying tool post.

18 Claims, 12 Drawing Sheets

MULTIPLE MACHINE TOOL SUPPORT BLOCK AND TOOL POST HAVING INTERNAL COOLANT SUPPLY

BACKGROUND OF THE INVENTION

1. Field of the Invention

The present invention relates generally to a multiple tool support block which may be supported on a standard machining system by a tool post or by any other suitable support mechanism. This invention also concerns a multiple tool support block having an internal coolant supply system for delivery of coolant fluid flow from the support block to a plurality of machine tools that are releasably and adjustably mounted to the support block. The present invention also concerns a tool post mounted multi-tool support block having coolant supply thereto via an internal coolant supply system of the tool post.

2. Description of the Prior Art

The use of multiple tool support blocks is well known in the machining industry. Support blocks having a plurality of tool support stations can be releasably mounted to a machining system in any suitable manner. Each of the tool support stations typically is defined by a tool support receptacle within which a shank portion of a machine tool is located and secured by suitable retainer members. Each machine tool is typically releasably retained in its operating position by means of set screws or any other type of retention system.

Typically each machine tool comprises a shank having a configuration for precision fit within a tool support receptacle and a cutter support head having a cutter support seat to which is releasably retained a metal cutting insert. When a metal cutting insert has become worn or damaged by a machining process, it is released and removed from the cutter support seat and replaced with a new or renovated metal cutting insert.

Multiple tool support blocks are at times supported by dove-tail support connections wherein a tool support block is provided with an internal or external dove-tail mount and a tool holder is provided with the opposite of an internal or external dove-tail mount. The tool holder is then provided with a tool support receptacle or tool mounting device, thus permitting one or more tool holders to be efficiently supported and adjusted to suit the character of the machining operation that is involved.

During machining operations, metal cutting inserts typically generate significant heat that varies according to the features of a machining operation, including the type of metal being machined, the depth or thickness of the machining cuts being made and the speed at which machining takes place. To minimize the effects of heat that typically occurs at the machining interface of the metal cutting inserts with the workpiece, a constant flow of coolant fluid is typically applied to the machining interface during a machining operation. Machining systems are provided with a coolant supply having a pump to supply coolant under desired pressure and conduits to conduct the coolant from the pump discharge to the metal cutting interfaces. In the case of tool support blocks for multiple metal cutting tools, a coolant delivery conduit is typically provided for each metal cutting tool. Since the tools are supported by a single tool support block, the replaceable metal cutting inserts of the machine tools are typically located a substantial distance from the pump discharge. Long and flexible coolant delivery conduits are typically provided to span the distance from the pump discharge to the metal cutting interfaces of the various machine tools. In the case of medium to high coolant supply pressures the long and flexible coolant delivery conduits tend to whip about as the coolant is jetted to the various metal cutting interfaces and by the vibration that occurs during the machining process. At times these long and flexible coolant delivery tubes can become moved by the reaction to coolant pressure discharge or machining vibration to the point that one or more of the metal cutting inserts can become starved of coolant fluid and become overheated. The unusual buildup of heat at the machining interface causes significant and severe wear of the metal cutting inserts, requiring frequent cutter replacement thus detracting from the efficiency and accuracy of the machining operation. It is desirable therefore to provide a multi-tool support block having an efficient and reliable coolant delivery system to the various machine tools that are supported and used during machining. It is also desirable to provide a multi-tool support block having a coolant supply system that provides for efficient delivery of coolant to multiple metal cutting interfaces via a plurality of relative short and easily positioned coolant delivery conduits that receive coolant fluid flow from internal fluid passages of the multiple tool support block. It is also desirable to provide for coolant fluid supply to the multiple tool support block via internal coolant fluid supply passages of a tool post mechanism.

SUMMARY OF THE INVENTION

It is a principal feature of the present invention to provide a novel coolant delivery system for multiple tool support blocks that are mounted to a machining system;

It is another feature of the present invention to provide a novel tool support block for supporting and positioning multiple metal working tools, which tool support block is provided with an internal coolant supply having manifold and tool feed passages through which coolant fluid is conducted to positions near the machine tools that are supported thereby;

It is also a feature of the present invention to provide a novel tool support block for supporting and positioning multiple metal working tools which is provided with multiple internal supply passages that are adapted to be individually opened or closed to provide coolant flow only the machine tools that are being utilized at any point in the machining process;

It is another feature of the present invention to provide a novel tool support block that is adapted with a mount system that permits the tool support block to be mounted to a machining system via a tool post; and It is an even further feature of the present invention to provide a novel tool support block having internal coolant supply passages that are adapted to receive pressurized coolant supply via a tool post mechanism that is also provided with an internal coolant supply having fluid communication with the pump discharge of a machining system.

Briefly, the various objects and features of the present invention are realized through the provision of a novel tool support block that is adapted for supporting and positioning multiple metal working tools so that successive machining operations can be carried out without any necessity for removing and replacing individual machine tools between operations. The tool support block is provided with a plurality of machine tool receptacles each having one or more set screws for locking each metal working tool at its machining position. The tool support block may also be provided with one or more dove-tail mounts that facilitate simple and efficient mounting to tool holder devices to the tool support block and thus provide for a wide range of machining functions.

The multiple tool support block is provided with an internal coolant supply manifold passage with multiple internal coolant delivery passages that each have communication with the internal coolant supply manifold passage. The multiple internal coolant delivery passages each intersecting an external surface of the tool support block and are provided with an internal thread connection. Passage closure members such as threaded plugs are selectively positioned in the internal thread connections to block the flow of coolant to machine tool stations of the tool support block that are not needed during particular machining operations.

One or more coolant distribution lines or conduits are connected at selected internal threaded connections and extend to the vicinity of the cutting interface of the respective cutter inserts and thus provide coolant flow or jets which are each directed to the metal cutting interface of the replaceable metal cutting insert of a particular machine tool.

The multiple machine tool support block is also provided with threaded coolant supply openings that are in communication with one or more internal coolant passages and permit coolant distribution tubes to be mounted at the threaded coolant supply openings and employed to establish coolant supplying connection with the internal coolant supply passages of machine tools incorporating coolant supplying cutter insert clamps or other machine tool mounted coolant supply device.

The multiple tool support block is further provided with a dove-tail block support mount that permits its mounting to a tool post that is in turn mounted to the slide or other support of a machining system. The tool post is preferably of the type having an internal coolant fluid supply system and is connected in coolant supplying relation with the multiple tool support block.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an isometric illustration showing a multiple tool support block being mounted to a coolant supplying tool post of a machining system and showing coolant distribution conduits being connected to the coolant passages of the support block for delivery to coolant to the machine tools of selected cutter insert supporting tools mounted at selected tool stations thereof;

FIG. 2 is an isometric illustration of the multiple tool support block of FIG. 1 and being shown in longitudinal section for illustration of the internal coolant passages thereof;

FIG. 3 is an isometric illustration in longitudinal section showing the rear portion of the multiple tool support block of FIGS. 1 and 2 and further showing the internal coolant passages thereof;

FIG. 4 is an isometric illustration showing the multiple tool support block of the present invention with coolant distribution conduits being connected to the coolant supply passages of the tool block and each being arranged for delivery of coolant to the metal cutting interface of an individual machine tool, (not shown for the purpose of simplicity);

FIG. 5 is an isometric illustration showing a machine tool mounting block, supporting a machine tool having an internal coolant supplying system, the mounting block having a dove-tail mount that receives the corresponding dove-tail mount of the multiple tool support block or other support device;

FIG. 6 is an isometric illustration showing the machine tool mounting block of FIGS. 1 and 5, showing the components thereof in greater detail;

FIG. 7 is an isometric illustration showing the rear portion of the machine tool mounting block of FIGS. 5 and 6;

FIG. 8 is an isometric illustration showing a machine tool mounting block of FIG. 1 which is provided with a tool clamping block and is adapted for clamping support and orientation of a machine tool, such as a double ended cut-off tool;

FIG. 9 is an isometric illustration showing the machine tool mounting block and tool clamping block of FIG. 8, with the machine tool removed;

FIG. 10 is an exploded isometric illustration showing the separated condition of the machine tool mounting block and machine tool support block of FIG. 9 and showing a mounting pin and retainer bolt arrangement that permits minute relative adjustment of the machine tool support block as may be desired for precision adjustment of the position of a machine tool supported thereby;

Figure 9:
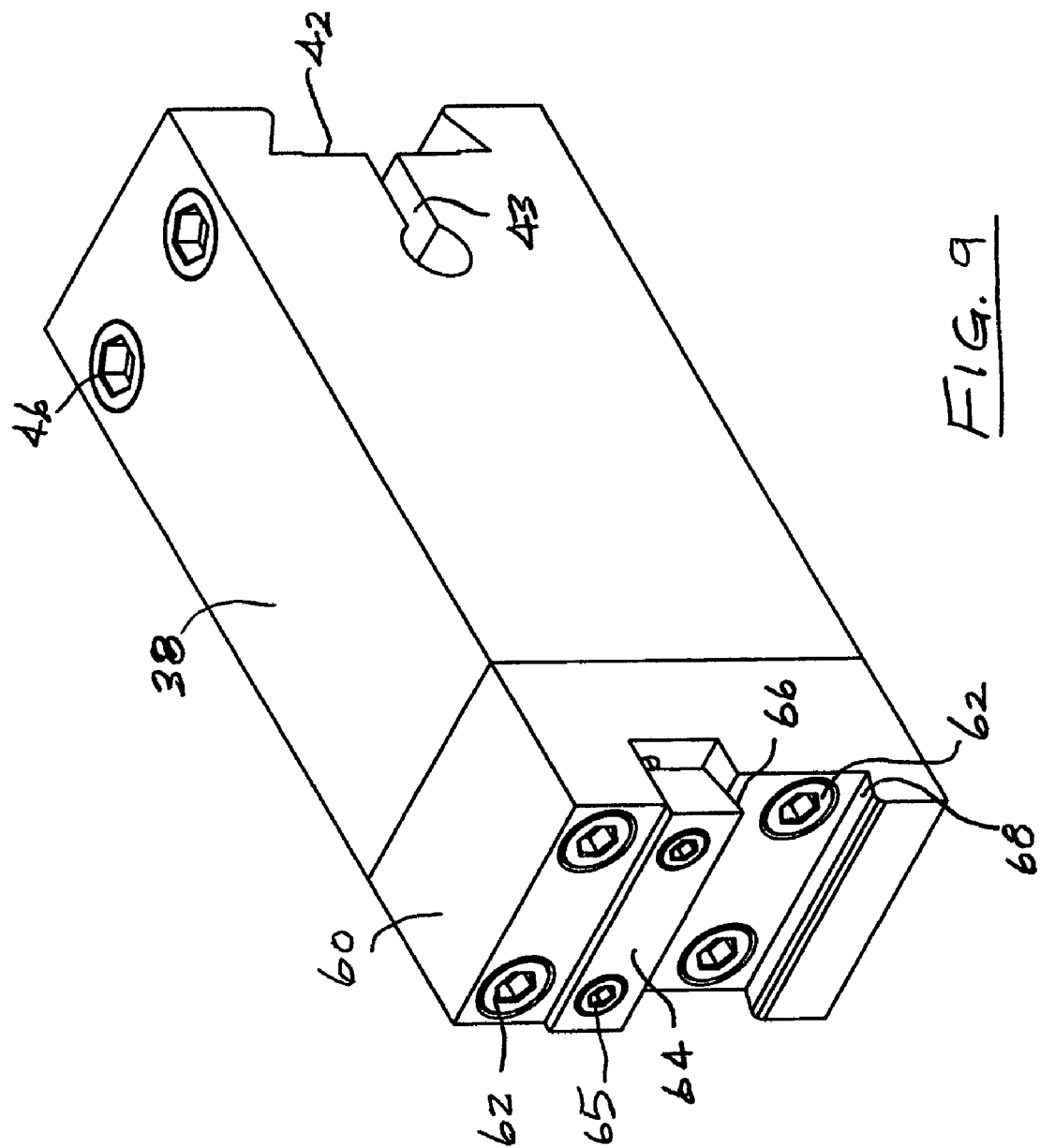
Figure 10:
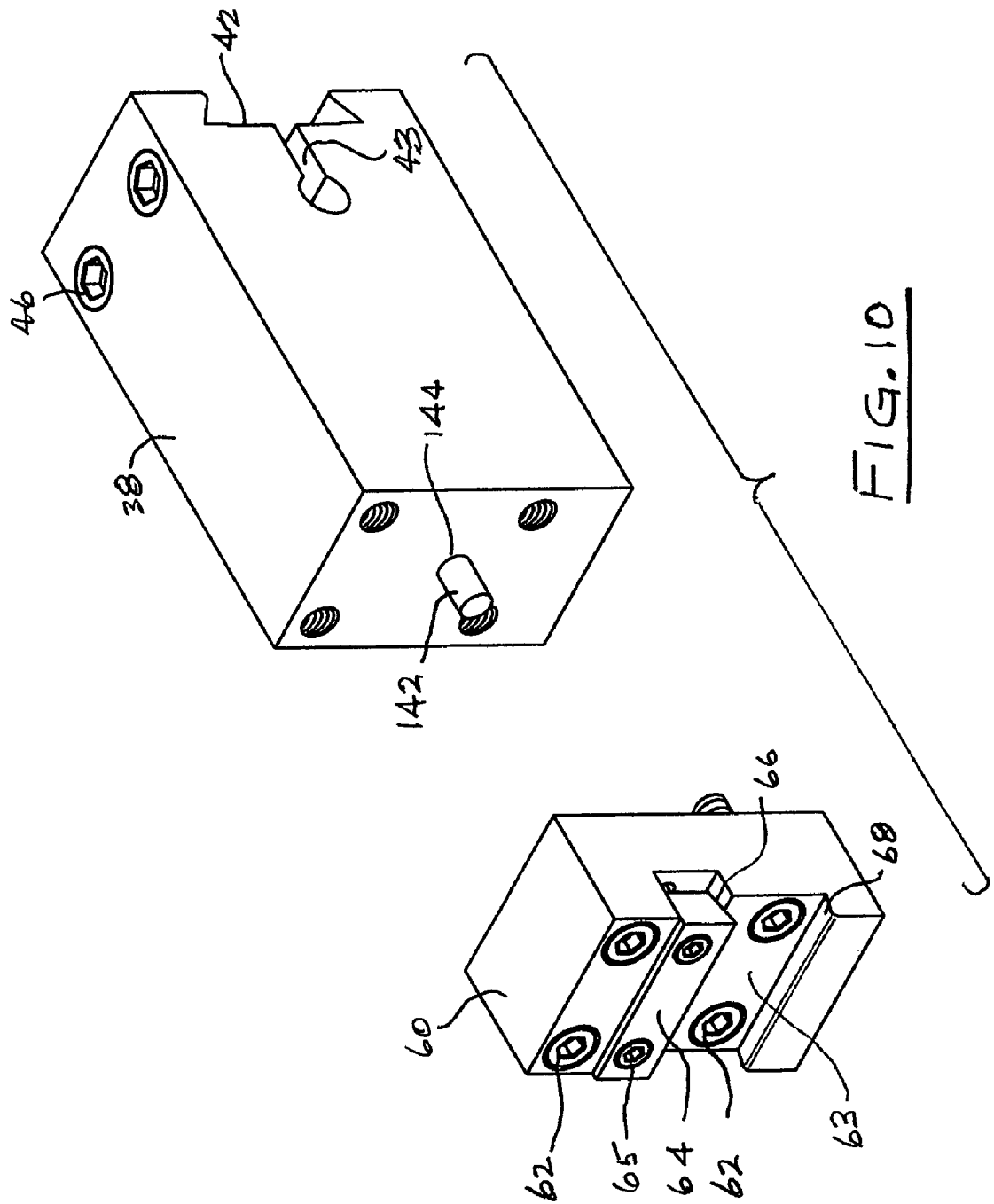
Figure 11:
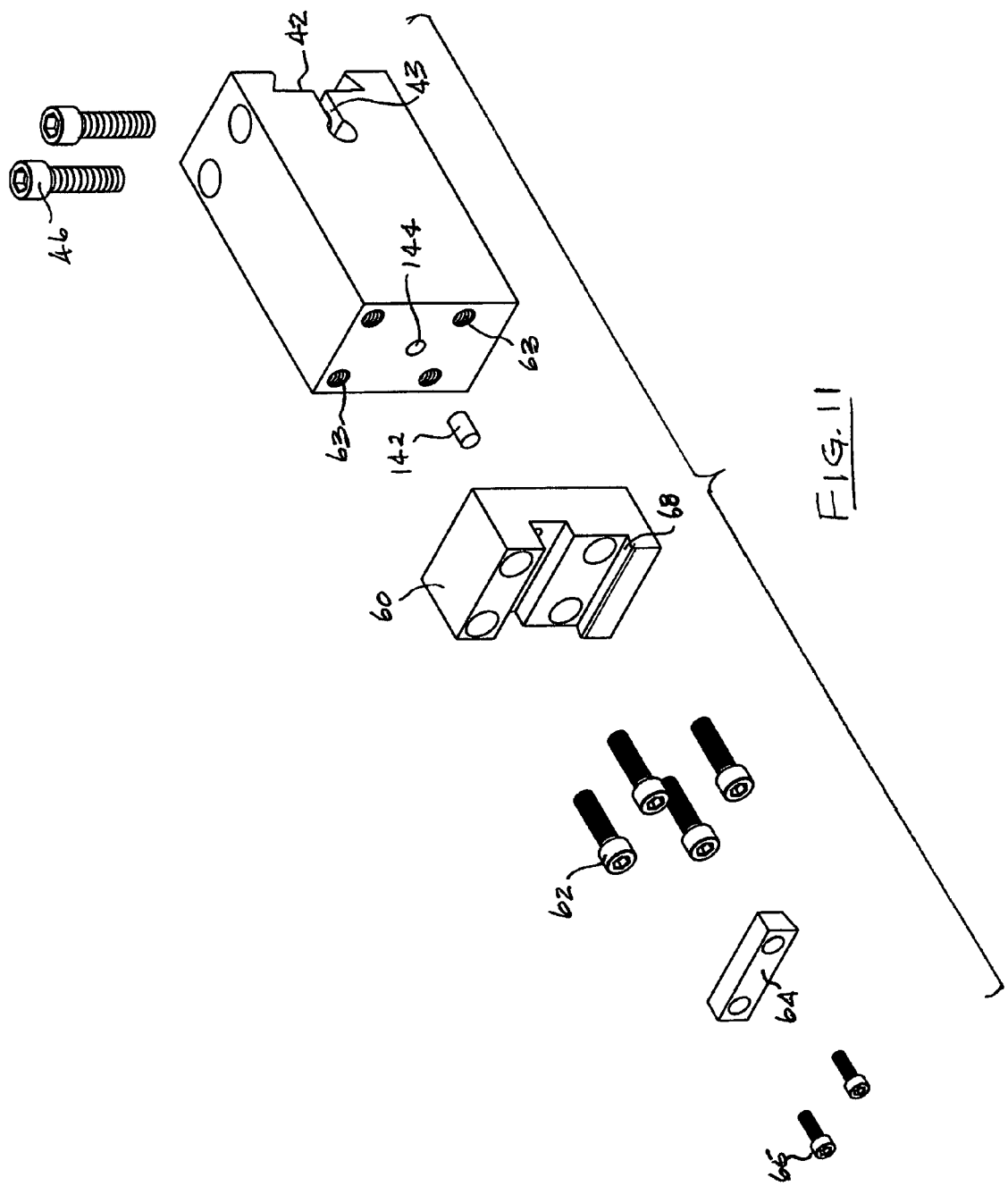
Figure 12:
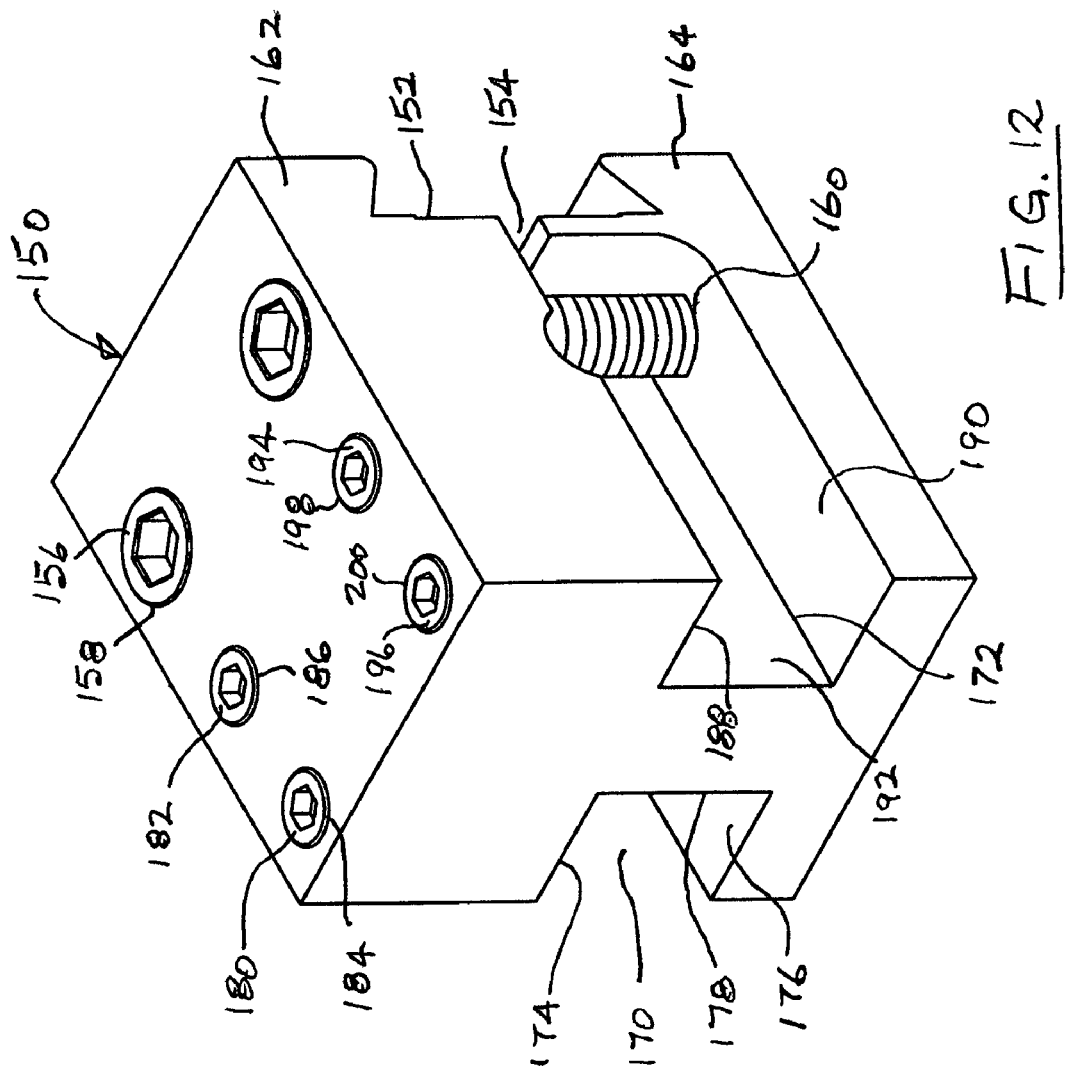

FIG. 11 is another exploded isometric illustration showing the various components of the machine tool mounting block and machine tool support block of FIGS. 9 and 10; and FIG. 12 is an isometric illustration showing a machine tool mounting block of different character, having a dove-tail mount for mounting to the multiple machine tool support block and having opposed laterally oriented machine tool mounting receptacles within which the rectangular shanks of a machine tool can be positioned at a desired orientation and retained;

DETAILED DESCRIPTION OF PREFERRED EMBODIMENT

Referring now to the drawings and first to FIGS. 1-4, a multiple machine tool support and coolant supply block system is shown generally at 10 and is shown to be mounted to the slide or other tool support 12 of a machine tool. A coolant supplying tool post mechanism, shown generally at 14 is shown to be mounted to the slide 12 of the machining system and is locked and unlocked by manual rotation of a tool post operating handle 16. The tool post mechanism is provided with a tool post body 18 having an internal coolant supply passage system that is fed with pressurized coolant from a coolant supply pump of a machining system via a coolant supply conduit that extends from the coolant supply pump and is connected to the tool post body by means of a valve controlled coupling 22 that is typically threaded into the tool post body. The coolant supplying tool post mechanism 14 may conveniently take the form that is set forth in U.S. patent application Ser. No. 11/544,137 of Enrico R. Giannetti which was filed on Oct. 5, 2006 and is entitled "Quick-setting Indexing Tool Post Having Coolant Supply", which patent application is incorporated herein by reference for all purposes.

A multiple tool support block 24 is adapted with a rearwardly facing dove-tail mount 26 which is adapted to receive the external dove-tail mount 28 of the tool post mechanism 14. The position of the multiple tool support block 24 relative to the tool post mechanism is established by adjustment of positioning bolt and nut assembly, shown generally at 30 which incorporates a threaded stud 31 about which is received a positioning washer 32 that engages the upper surface 34 of the tool post body 18 at the dove-tail mount 28. A position adjustment nut 33 is threaded to the threaded stud 31 and is manually rotated by a conventional wrench to establish a desired position of the multiple tool support block with respect to the tool post. The coolant supplying tool post mechanism 14 is provided with a locking mechanism that is actuated to locking and release positions upon manual rotation of the tool post operating handle 16.

The multiple tool support block 24 defines an external, generally horizontal dove-tail mount 36 having undercut angulated surfaces 37 and 39 to which may be mounted one or more tool mounting blocks 38 and 40, each having split internal dove-tail mounts, such as shown at 42 and 44 which define slots 45 that render the internal dove-tail mounts flexible and yieldable. The mounts 42 and 44 are thus yieldable to establish clamping retention to the external, generally horizontal dove-tail mount 36 by means of clamp screws or bolts 46 that are received within threaded openings 47. The multiple tool support block 24 further defines a plurality of tool receptacles 48 which are shown in the drawings as being of circular cross-sectional configuration, but which may be of any other suitable cross-sectional configuration that suits the intended purpose. Threaded tool locking holes 50, there being three shown for each of the tool receptacles 48. Set screws 52 or other types of locking members are threaded through the threaded holes 50 and establish retaining engagement with a machine tool 54 that is located within the tool receptacle.

The tool mounting blocks 38 and 40 are provided for supporting different types of machine tools 56 and 58 that require specific orientation for the machine work that is intended by each. For example, tool 56 may be a double ended cut-off or threading tool and defines a cutter seat within which a replaceable metal cutting insert 58 is releasably retained. A tool clamp block 60 is shown to be mounted to the tool mounting block 38 by means of a plurality of retainer screws or bolts 62. A clamp bar 64 having an angulated clamping surface 66 is retained in assembly with the tool clamp block 60 and serves to urge the tool 56 to seated and locked position with respect to an inclined clamping surface 68 of the tool support mount that is defined by the tool clamp block 60. The tool clamp block, its construction and function will be described in greater detail in connection with FIG. 6.

Figure 1:
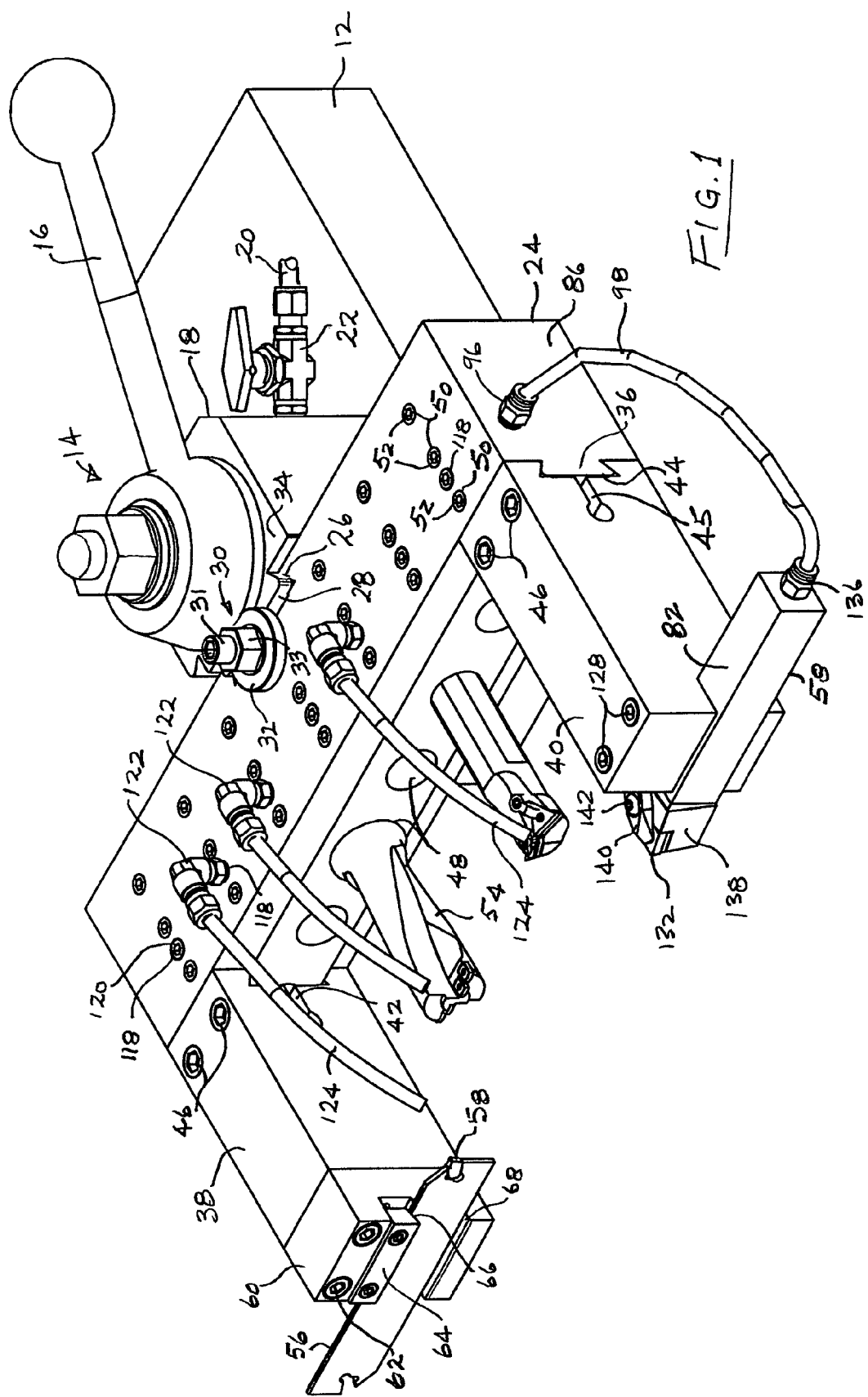
Figure 8:
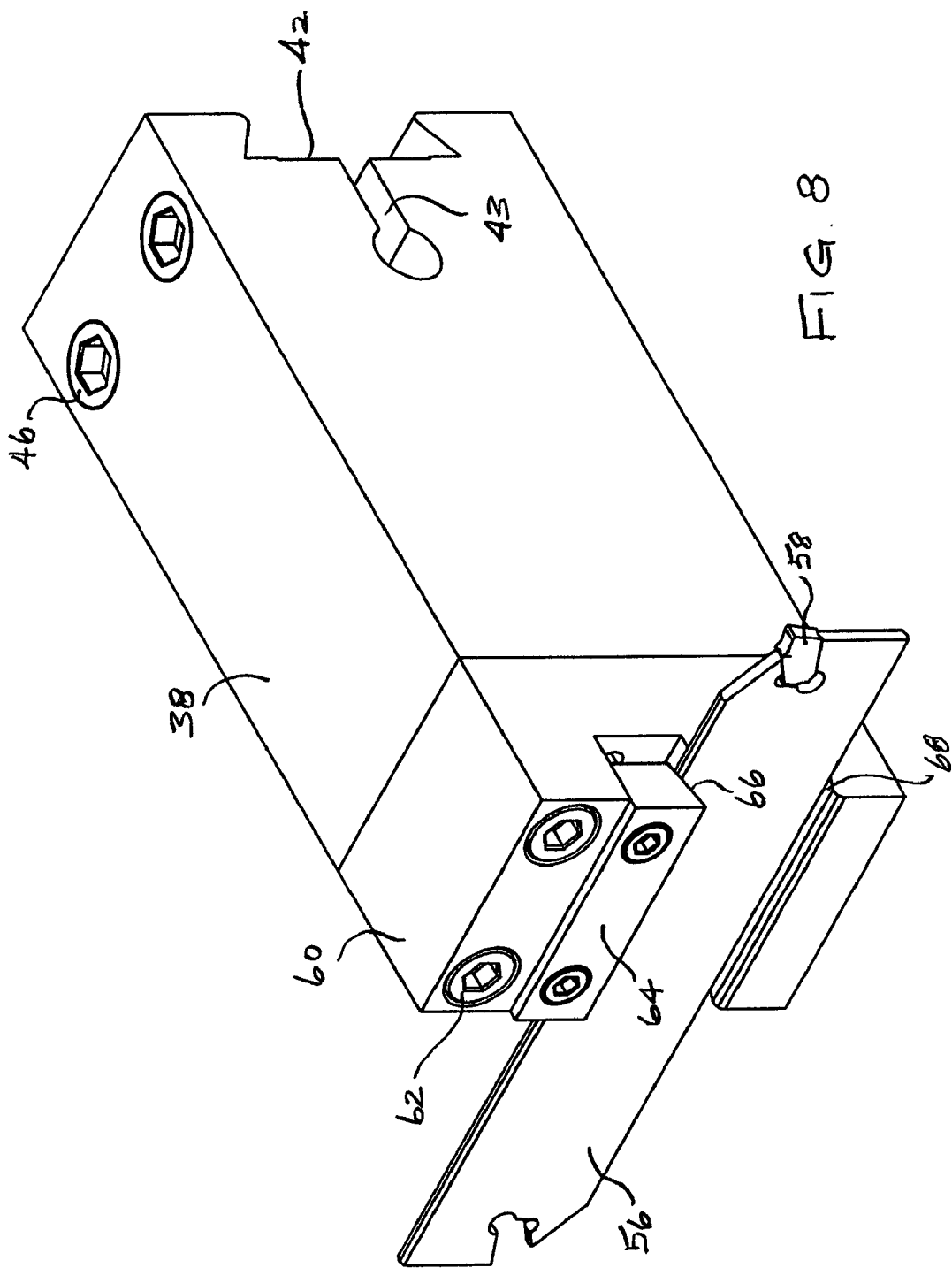

As shown in FIGS. 1 and 8, the tool mounting block 40 defines a tool support slot 70 which is of rectangular form, being defined by a rear slot surface 72 and parallel upper and lower slot surfaces 74 and 76. Set screws or bolts 78 are threaded into threaded holes 80 and establish retaining engagement with the rectangular shank of the metal working tool 58.

During machining operations it is desirable to provide an efficient flow or coolant fluid to the cutting interfaces of each of the metal working tools that are mounted to the multiple tool support block 24, thus prolonging the working life of the metal cutting inserts that are supported by each of the machine tools. It is also desirable to provide coolant distribution conduits for each of the machine tools that are as short as practical, thus minimizing the potential for inadvertent misorientation of the outlet ends of the coolant distribution conduits, such as by vibration during machining or due to contact by machine cuttings resulting from the machining operation. It is also desirable to provide for supply of coolant fluid to the immediate vicinity of the various machine tools without the typical necessity to provide long coolant supply lines near multiple machining operations. These features are realized as shown in FIGS. 1-4 and particularly by the sectional isometric illustrations of FIGS. 2 and 3. The multiple tool support block 24 defines a generally horizontally oriented coolant fluid supply manifold passage 82 that is located in substantially parallel relation with the generally horizontal external dove-tail mount 36. At least one and preferably both ends of the coolant fluid supply manifold passage 82 intersect respective end surfaces 84 and 86 of the multiple tool support block 24 and define threaded openings 88 and 90 within which are located removable closure members 92 and 94 that may conveniently be provided in the form of threaded plug members that are received within the threaded openings. Either of the closure members 92 and 94 may be removed from its threaded opening and a coolant fluid supply conduit fitting, such as shown at 96 in FIG. 1, may be threaded in its place to provide for connection of a coolant fluid distribution conduit 98 in fluid communication with the coolant fluid supply manifold passage 82.

Figure 2:
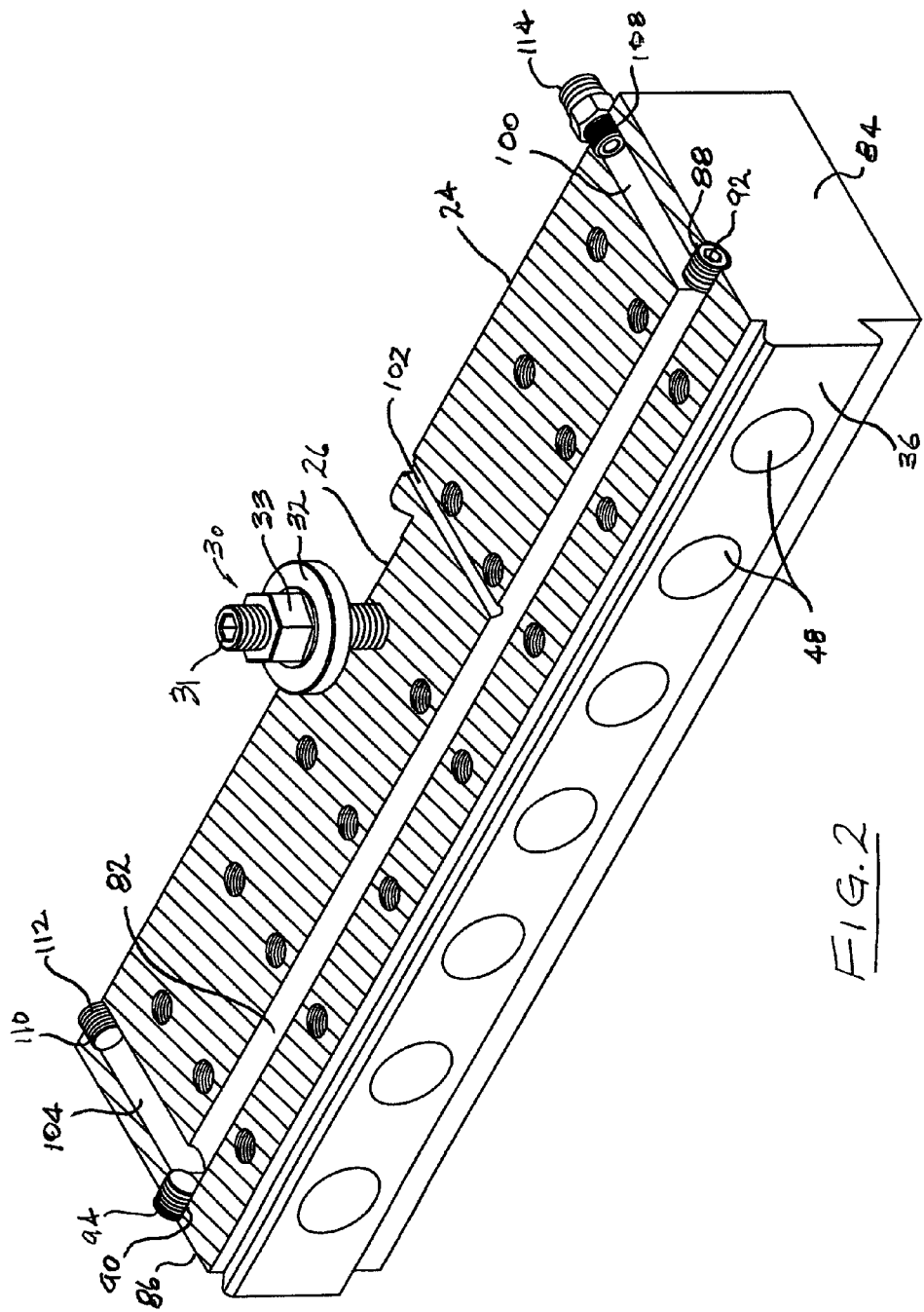
Figure 3:
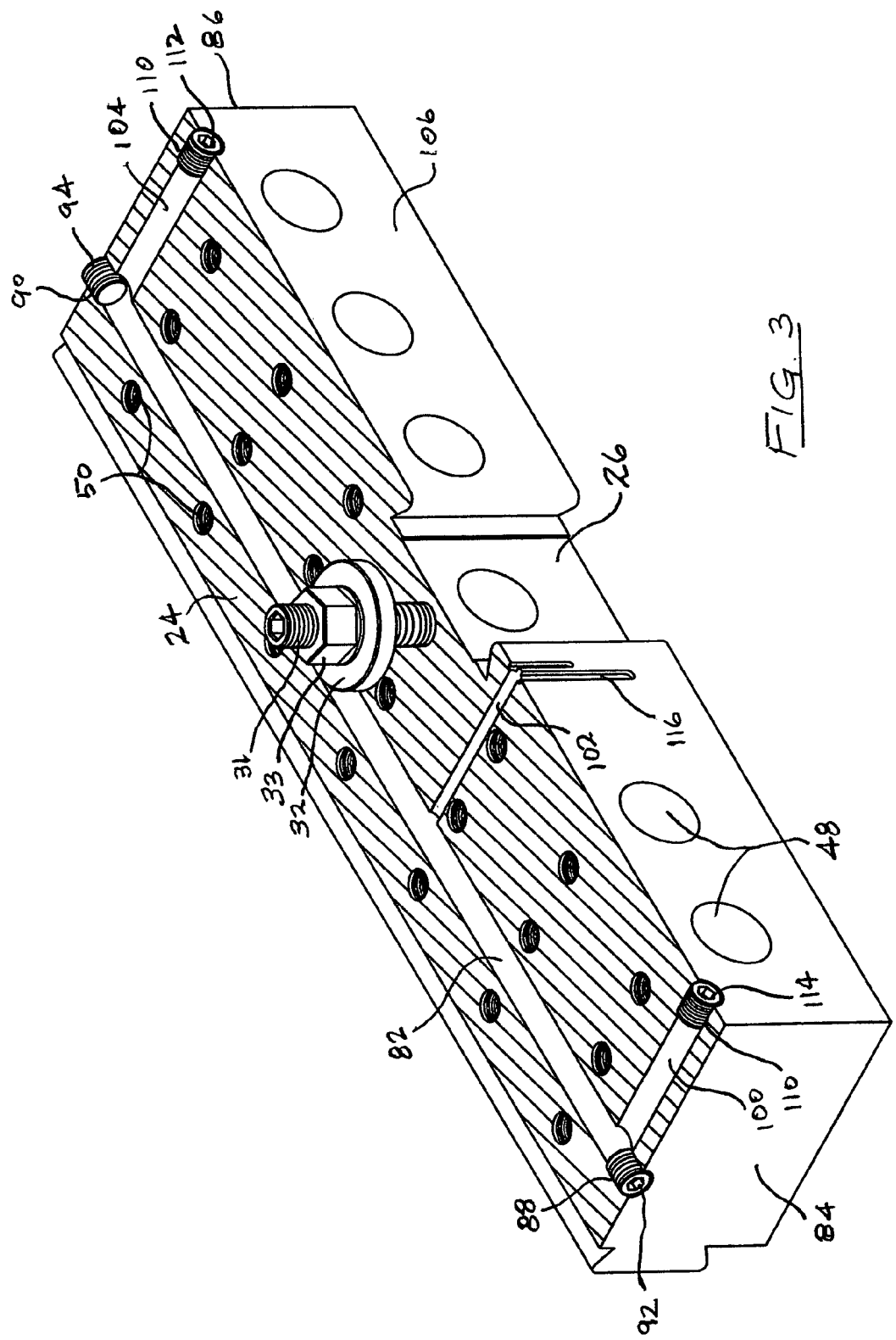

Lateral coolant fluid supply passages 100, 102 and 104 are also formed within the multiple tool support block 24 and are each in fluid communication with the coolant fluid supply manifold passage 82. Passages 100 and 104 intersect the rear surface 106 of the multiple tool support block 24 and have internally threaded openings 108 and 110. Both threaded openings may receive threaded closure plug members as shown at 112 as shown in FIG. 3, or if desired a coolant supply conduit connector fitting 114 may be threaded into one of the threaded openings 108 or 110 as shown in FIG. 2 to provide for connection of a coolant fluid supply conduit to the multiple tool support block 24.

It is intended within the spirit and scope of the present invention to provide for coolant fluid supply to the multiple tool support block 24 via a coolant fluid supplying tool post such as is shown generally at 14. The lateral coolant fluid supply passage 102 is in fluid communication with elongate coolant fluid supply channels or grooves 116 which are defined within the rear surface 106 of the multiple tool support block 24. When the multiple tool support block 24 is mounted to a coolant fluid supplying tool post, a coolant supply port of the tool post is disposed in communication with the elongate coolant fluid supply channels or grooves 116, thus supplying coolant flow to the lateral coolant fluid supply passage 102. A planar surface of the tool post body will be disposed in tight surface to surface engagement with the rear surface 106, thereby preventing any leakage of coolant at the connection of the tool post and multiple tool support block 24. Additionally, the coolant port of the tool post will be provided with one or more seal members that prevent coolant leakage at the tool post and multiple tool support body connection. The elongate coolant fluid supply grooves or channels 116 permit linear adjustment of the relative positions of the tool post and multiple tool support body while maintaining fluid communication of the coolant fluid supply passage outlet of the tool post with respect to the coolant fluid supply channels 116 and lateral passage 102 of the multiple tool support block 24.

Figure 4:
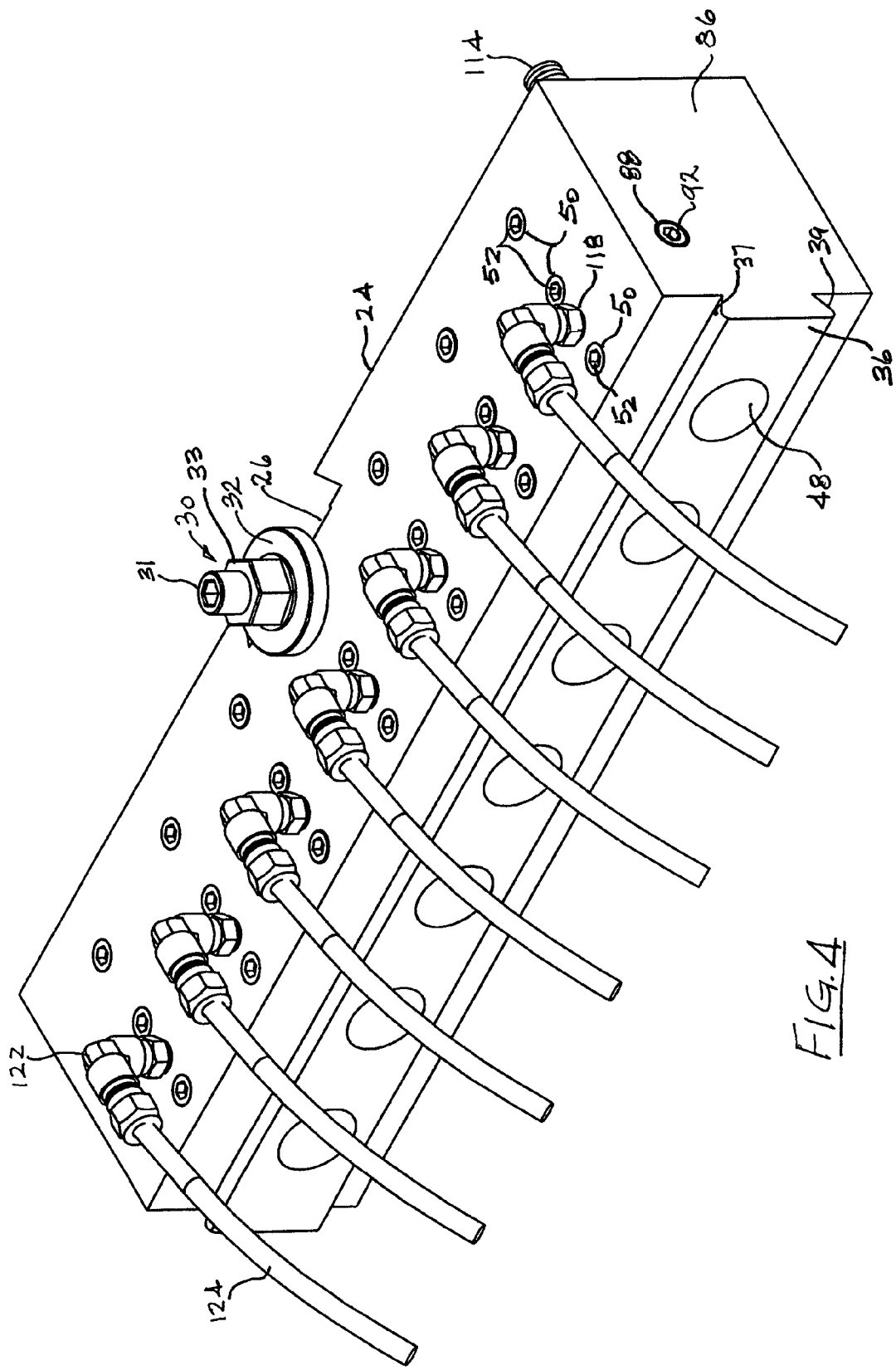

Referring now to FIGS. 1 and 4, the multiple tool support block 24 is machined to define a plurality of threaded coolant fluid supply openings 118 each having fluid communication with the coolant fluid supply manifold passage 82. These threaded coolant fluid supply openings 118 are adapted to receive closure plug members 120 or coolant fluid distribution conduit connector fittings 122 for mounting of relatively short coolant fluid distribution conduits 124 to the multiple tool support block 24 for each of the machine tools 54 that are engaged within selected tool receptacles 48. Thus, when a machine tool is not present within a particular machine tool receptacle, its threaded coolant supply opening will be closed by threading a closure plug 120 into the opening. When a machine tool is present within a particular machine tool receptacle, a coolant distribution conduit fitting 122 will be threaded into the respective coolant fluid supply opening. The position of the relatively short coolant fluid distribution conduit 124 that is mounted by the fitting 122 can easily be manually adjusted so that its discharge opening will be located to direct a flow of coolant fluid onto the machining interface of the replaceable metal cutting insert thereof with respect to the moving part being machined.

Figure 5:
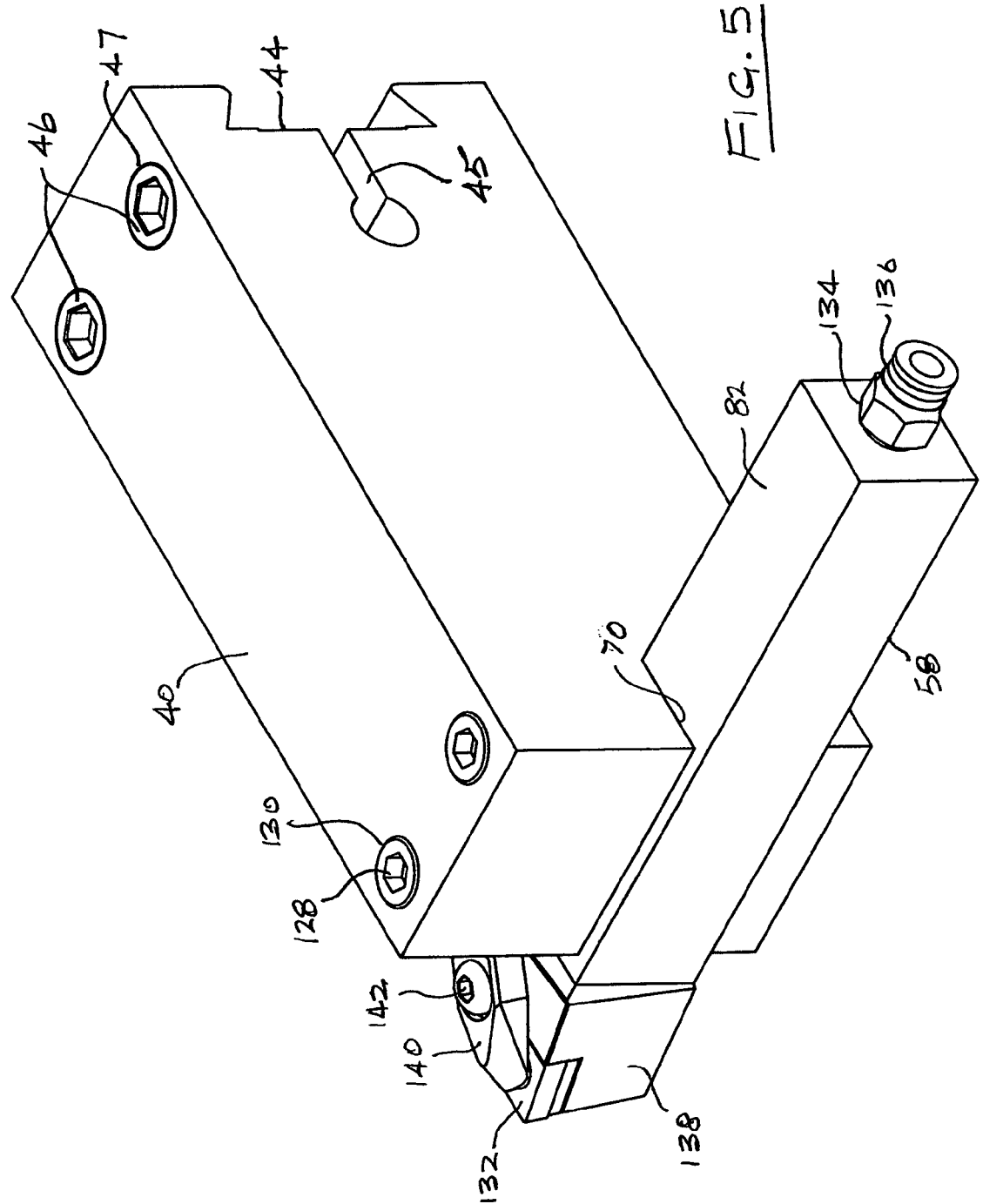
Figure 6:
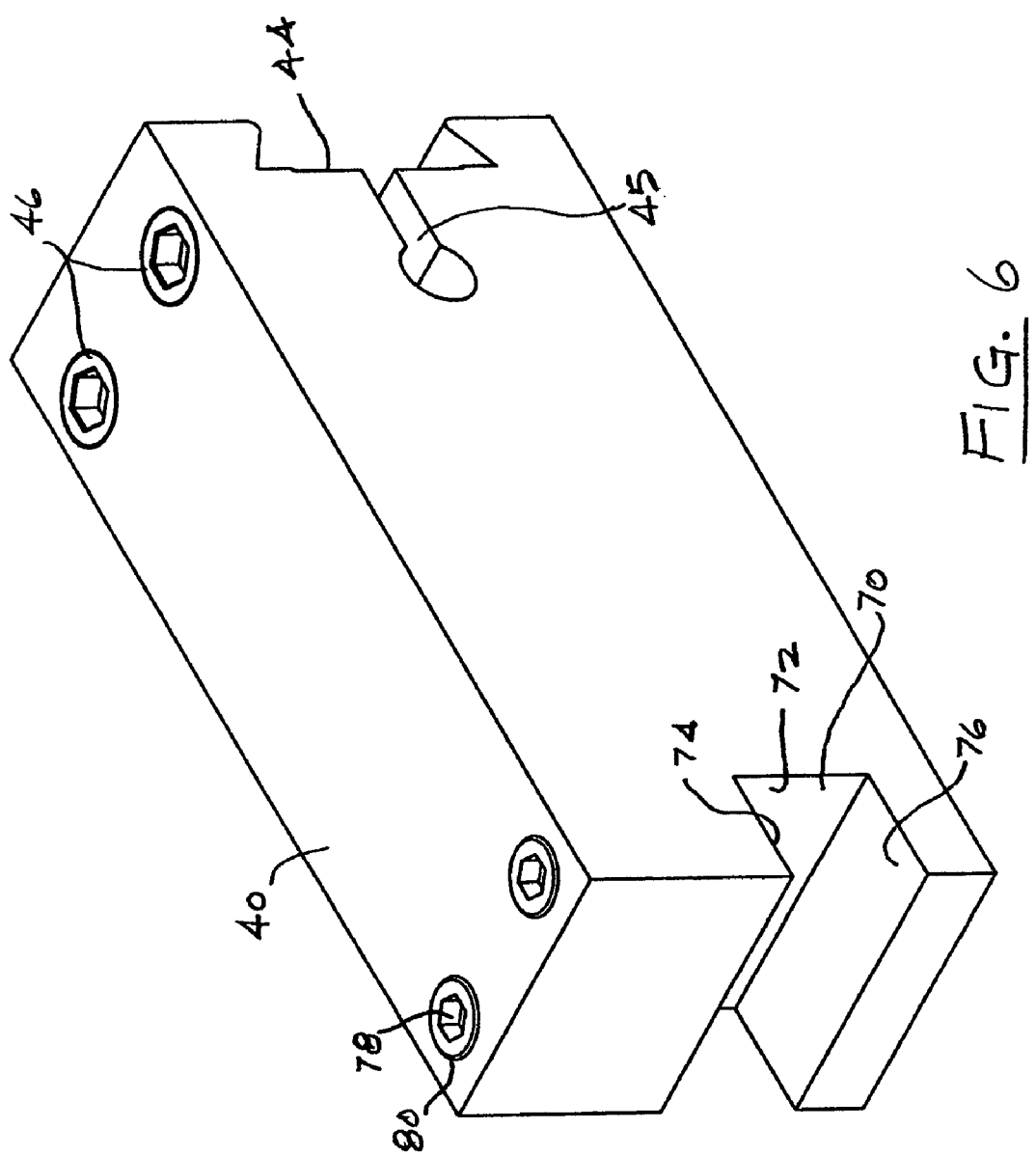
Figure 7:
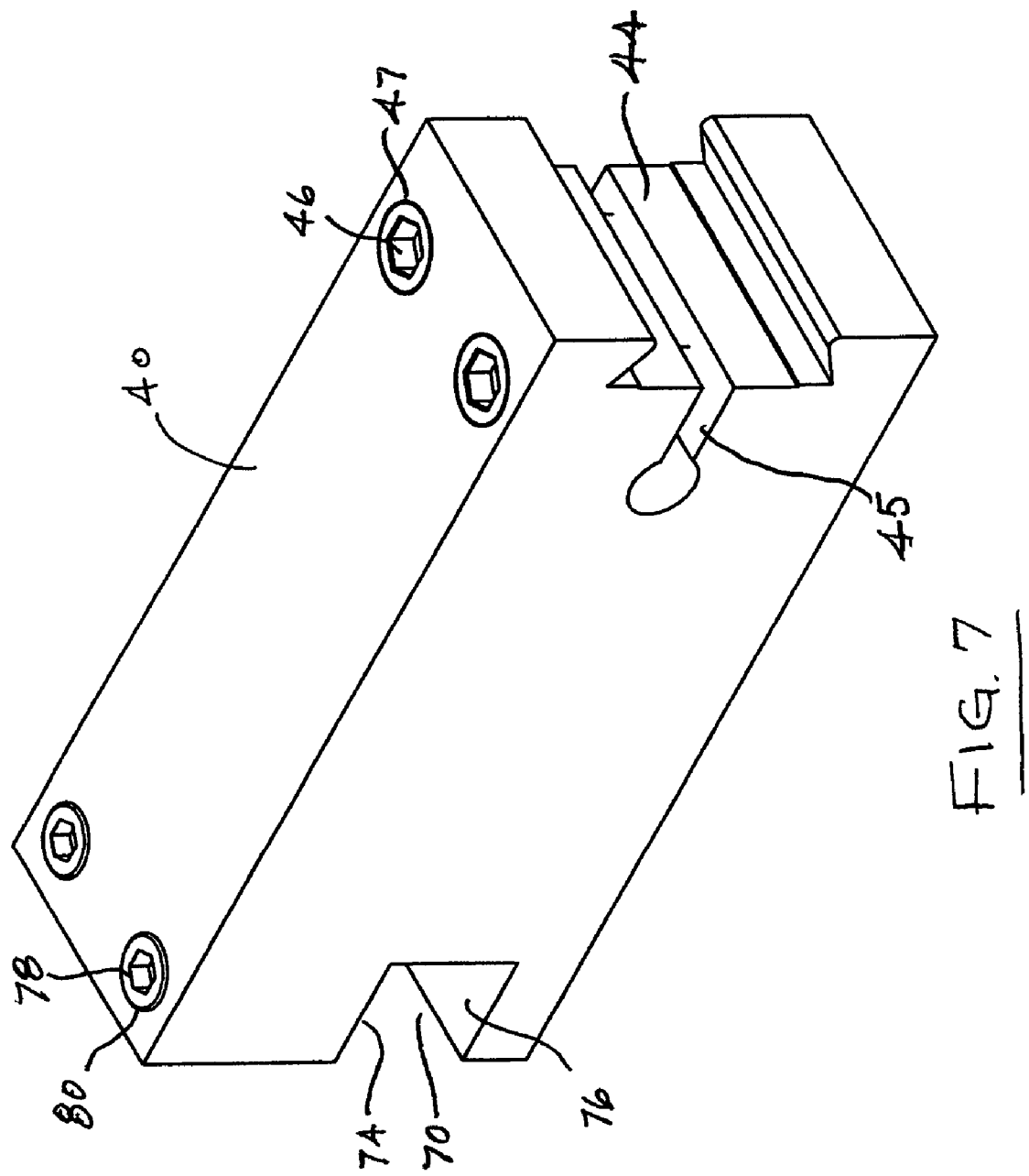

With reference to FIGS. 5-7, the tool mounting block 40, also shown in FIG. 1 defines a split internal dove-tail mount 44 having a slot 45 that renders the internal dove-tail mount flexible and yieldable for clamping retention to the external, generally horizontal dove-tail mount 36 of the multiple tool support block 24 by means of clamp screws or bolts 46 as explained above. The tool mounting blocks 40 is shown to define a rectangular tool mounting receptacle 70, as explained above, within which the rectangular shank 82 of a machine tool 58 is received. Tool retainer screws 128 are received within internally threaded openings 130 and engage the rectangular shank 82 to secure the machine tool 58 within its tool mounting receptacle 70. This mounting arrangement is particularly advantageous when the machine tool must be mounted with a particular orientation for a particular machining operation and when a machine tool is provided with internal coolant flow passages for delivery of coolant fluid precisely at the machining interface of a replaceable metal cutting insert 132 with a rotating or other moving workpiece.

The machine tool 58 may conveniently be of the type that is disclosed in U.S. patent application Ser. No. 11/024,578 of Enrico R. Giannetti, the inventor of the subject matter that is disclosed in the present application, which was filed on Oct. 5, 2006 and is entitled "Boring Bar Having Internal Coolant Supply". The rectangular shank 82 of the machine tool is machined to define an internal coolant fluid supply passage having a threaded opening 134 within which is threaded a coolant conduit connector fitting 136 providing for connection of the coolant fluid supply conduit 98 shown in FIG. 1. The head structure 138 of the machine tool 58 has internal coolant flow passages therein and a clamp 140 and clamp mounting screw 142 secure the replaceable metal cutting insert 132 to the head structure 138. The clamp and clamp mounting screw cooperatively define fluid passages and coolant jet openings that permit one or more jets of coolant fluid to be projected from the clamp structure directly onto the machining interface of the replaceable metal cutting insert 132 with the rotating or other moveable workpiece being machined.

With reference to FIGS. 8-11, it may be appropriate to support certain types of machine tools in selected positions for achieving selected machining operations and to provide the tools with coolant fluid flow either internally or externally of the tools. A tool mounting block 38, as described above, defines an internal dove-tail mount 42 that is adapted to receive the elongate external generally horizontal dove-tail mount 36 of the multiple tool mounting block 24. The tool mounting block 38 is moved along the length of the external generally horizontal dove-tail mount 36 until its desired position is reached. The clamp screws or bolts 46 are then tightened to flex the opposed sections of the internal dove-tail mount 42 relative to the slot 43 and thereby achieve clamping of the tool support block to the multiple tool mounting block. A tool clamp block 60 is shown to be mounted to the tool mounting block 38 by means of a plurality of retainer screws or bolts 62. A clamp bar 64 having an angulated clamping surface 66 is retained in assembly with the tool clamp block 60 and serves to urge the tool 56 to seated and locked position with respect to an inclined clamping surface 68 of the tool support mount that is defined by the tool clamp block 60.

The tool mounting block and tool clamp block arrangement is designed to enable a user to achieve minute relative adjustment thereby permitting minute adjustment of the position of the machine tool. As shown in the exploded views of FIGS. 10 and 11, a portion of a positioning pin 142 is received within a centralized bore 144 of the tool mounting block 38 and the opposite portion of the positioning pin is received within a centralized bore of the tool clamp block 60. The positioning pin is loosely fitted within one or both of the centralized bores. The somewhat loose fit of the positioning pin within the bores permits the tool clamp block 60 to have slight omnidirectional lateral movement, thus permitting the clamp block 60 to be shifted laterally within the limits that are permitted by the looseness of fit. This feature permits a machine tool that is clamped within the tool mounting receptacle to be adjustably moved a few thousandths of an inch so that the cutting edge of the machining insert can be precisely positioned as needed for a particular machining operation.

A machine tool, such as a cut-off or threading tool 56 is placed within the tool mounting receptacle 63 of the tool clamp block and is oriented by the tapered or undercut surface 68. Cutting tool orientation is also caused by a tapered or inclined clamping surface 66 of a clamp bar member 64, which is retained to the clamp block 60 by means of clamping screws or bolts 65 that are threaded into internally threaded holes of the tool clamp block. With the retainer screws 62 slightly loose and the machine tool clamped within its tool mounting receptacle 63 the machine tool can be forcibly moved laterally to a precise position. The upper two retainer screws 62 can then be tightened to fix the selected position of the tool clamp block 60 relative to the tool mounting block 38. The clamp bar 64 can then be removed to permit removal of the machine tool, thereby exposing the lower two retainer screws 62 and permitting tightening via the use of a simple Allen wrench. The machine tool can then be replaced and secured in its desired position by clamping.

Referring now to FIG. 12, a machine tool mounting block is shown generally at 150 which is adapted for positioning and support of either two machine tools or more practically a single machine tool at either of two positions. The machine tool mounting block 150 defines an internal dove-tail mount 152 that is split by means of a centrally located slot 154 to permit the mounting block to be flexible for purposes of clamping. Clamp screws 156 extend through screw openings 158 and are threaded into openings 160 and are adjusted, such as by means of an Allen wrench to forcibly draw the upper and lower undercut clamping sections 162 and 164 toward one another and thereby urge the undercut clamping surfaces 166 and 168 of the internal dove-tail mount into clamping engagement with the opposite tapered surfaces 37 and 39 of the external, generally horizontally oriented dove-tail mount The machine tool mounting block 150 defines opposed generally rectangular tool mounting receptacles 170 and 172 within which the rectangular shanks of machine tools may be received and releasably secured. Tool mounting receptacle is defined by upper and lower generally planar surfaces 174 and 176 that are disposed in parallel relation and each intersect a planar interior receptacle surface 178. Tool retainer screws 180 and 182 are each received by threaded holes 184 and 186, with the inner ends of the retainer screws in retaining engagement with the rectangular shank of a machine tool that is positioned within the tool mounting receptacle. Likewise, the generally rectangular tool mounting receptacle 172 is defined by upper and lower parallel planar surfaces 188 and 190 that are each disposed in intersecting relation with an inner planar receptacle surface 192. Another set of tool retainer screws 194 and 196 are received by threaded openings 198 and 200 and are adjustable by means of an Allen wrench to establish retaining engagement with the rectangular shank of a machine tool. Though the machine tool mounting block 150 is shown to have rectangular machine tool mounting receptacles, it should be borne in mind that the mounting receptacles may have any other suitable cross-sectional configuration for retention of any other type of machine tool.

In the event it may become desirable to remove an outlet closure plug member 118 from its threaded opening or remove a conduit fitting 96 or 122, this can be easily done without shutting down the machining system or turning off the coolant fluid pump of the machining system. A user will simply actuate the coolant supply valve of the valve controlled coupling 22 thereby isolating the coolant passages of the coolant supplying tool post and the multiple machine tool support block from the coolant fluid supply conduit 20. With the valve closed any changes of closure plugs or conduit connector fittings may be easily accomplished. The coolant fluid supply is restored simply by moving the valve actuator to the open position.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A coolant fluid supplying multiple machine tool support system, comprising:

a multiple machine tool support block adapted for support and movement by a machining system and having a dove-tail mount;

a plurality of machine tool receptacles being defined in said multiple machine tool support block and each being adapted for support of a machine tool therein;

at least one tool retainer member being carried by said multiple machine tool support block for each of said plurality of machine tool receptacles and having retaining engagement with a machine tool located within the machine tool receptacle;

at least one coolant passage being defined in said multiple machine tool support block and having a coolant supply inlet;

a plurality of coolant fluid supply outlets being defined in said multiple machine tool support block one coolant supply outlet for each of said plurality of machine tool receptacles and being in fluid communication with said least one coolant passage;

coolant distribution conduits being connected with selected coolant supply outlets and each being positioned for distribution of coolant to a machining interface of a specific machine tool with a workpiece being machined; and closure members being positioned at any non-selected coolant supply outlets and preventing coolant flow therefrom.

2. The coolant supplying multiple machine tool support system of claim 1, comprising:

said dove-tail mount being an external dove-tail mount of elongate configuration and being adapted for support of a plurality of machine tools; and a machine tool mounting block having an internal dove-tail mount receiving said external dove-tail mount and providing for support and orientation of a machine tool for a particular machining operation.

3. The coolant supplying multiple machine tool support system of claim 2, comprising:

an end coolant fluid outlet being defined at one end of said multiple machine tool support block; and a conduit connector fitting being threaded into said end coolant fluid outlet and having a coolant conduit extending therefrom to a machine tool supported by said machine tool mounting block.

4. The coolant supplying multiple machine tool support system of claim 1, comprising:

a tool post being mounted to a machining system and defining a first dove-tail mount; and a second dove-tail mount being defined by said multiple machine tool support block and receiving said first dove-tail mount and providing support for said multiple machine tool support block.

5. The coolant supplying multiple machine tool support system of claim 4, comprising:

said tool post being a coolant fluid supplying tool post having an internal coolant fluid passage system a coolant fluid inlet and a having a coolant fluid outlet at said first dove-tail mount; and said coolant fluid supply inlet of said multiple machine tool support block being in fluid communication with said coolant fluid outlet of said first dove-tail mount.

6. The coolant supplying multiple machine tool support system of claim 5, comprising:

a coolant fluid supply conduit being connected at said coolant fluid inlet of said coolant fluid supplying tool post; and a valve member being in fluid communication with said coolant fluid supply conduit and being moveable to open and closed positions for controlling the flow of coolant fluid to said coolant fluid inlet opening of said coolant fluid supplying tool post.

7. The coolant supplying multiple machine tool support system of claim 1, comprising:

an elongate coolant channel being defined on said multiple machine tool support block;

said coolant fluid outlet of said machine tool post being in communication with said elongate coolant channel;

said tool post defining a closure for said elongate coolant channel; and the position of said multiple machine tool support block being adjustable relative to said tool post while maintaining fluid communication of said coolant fluid outlet of said tool post with said elongate coolant channel of said multiple machine tool support block.

8. The coolant supplying multiple machine tool support system of claim 1, comprising:

a machine tool mounting block having a dove-tail mount adapted for clamping engagement with said dove-tail mount of said multiple machine tool support block; and a machine tool clamp block being mounted to said machine tool mounting block and defining a machine tool receptacle, said machine tool clamp block being adjustable relative to said machine tool mounting block to achieve minute adjustment of the position of a machine tool being received within said machine tool receptacle.

9. The coolant supplying multiple machine tool support system of claim 8, comprising:
- positioning pin openings being defined by said machine tool mounting block and said machine tool clamp block; and
- a positioning pin being received in loose fitting relation within said positioning pin openings and permitting slight rotational and omnidirectional lateral positioning of said machine tool clamp block relative to said machine tool mounting block for minute adjustment of the position of a machine tool secured within said machine tool receptacle.

10. A coolant fluid supplying multiple machine tool support system, comprising:
- a coolant fluid supplying tool post being mounted to a machining system for machine controlled movement and having an internal coolant passage system a coolant fluid inlet a coolant fluid outlet and a first dove-tail mount;
- a multiple machine tool support block having a second dove-tail mount in supported engagement with said first dove-tail mount;
- a plurality of machine tool receptacles being defined in said multiple machine tool support block and each being adapted for support of a machine tool therein;
- at least one tool retainer member being carried by said multiple machine tool support block for each of said plurality of machine tool receptacles and having retaining engagement with a machine tool located within a machine tool receptacle;
- at least one coolant passage being defined in said multiple machine tool support block and having a coolant supply inlet in fluid communication with said coolant fluid outlet of said coolant fluid supplying tool post.

11. The coolant fluid supplying multiple machine tool support system of claim 10, comprising:
- a plurality of coolant fluid supply outlets being defined in said multiple machine tool support block one coolant supply outlet for each of said plurality of machine tool receptacles and being in fluid communication with said at least one coolant passage;
- coolant fluid distribution conduits being connected with selected coolant supply outlets and each being positioned for distribution of coolant to a machining interface of a specific machine tool with a workpiece being machined; and
- closure members being positioned at any non-selected coolant supply outlets and preventing coolant flow therefrom.

12. The coolant fluid supplying multiple machine tool support system of claim 10, comprising:
- said dove-tail mount being an external dove-tail mount of elongate configuration and being adapted for support of a plurality of machine tools; and
- a machine tool mounting block having an internal dove-tail mount receiving said external dove-tail mount and providing for support and orientation of a machine tool for a particular machining operation.

13. The coolant supplying multiple machine tool support system of claim 12, comprising:
- an end coolant fluid outlet being defined at one end of said multiple machine tool support block; and
- a conduit connector fitting being threaded into said end coolant fluid outlet and having a coolant conduit extending therefrom to a machine tool supported by said machine tool mounting block.

14. The coolant supplying multiple machine tool support system of claim 10, comprising:
- said coolant fluid supplying tool post having said coolant fluid outlet located at said first dove-tail mount; and
- said coolant fluid supply inlet of said multiple machine tool support block being in fluid communication with said coolant fluid outlet of said first dove-tail mount.

15. The coolant supplying multiple machine tool support system of claim 14, comprising:
- a coolant fluid supply conduit being connected at said coolant fluid inlet of said coolant fluid supplying tool post; and
- a valve member being in fluid communication with said coolant fluid supply conduit and being moveable to open and closed positions for controlling the flow of coolant fluid to said coolant fluid inlet opening of said coolant fluid supplying tool post.

16. The coolant supplying multiple machine tool support system of claim 10, comprising:
- an elongate coolant channel being defined on said multiple machine tool support block;
- said coolant fluid outlet of said machine tool post being in communication with said elongate coolant channel;
- said tool post defining a closure for said elongate coolant channel; and
- the position of said multiple machine tool support block being adjustable relative to said tool post while maintaining fluid communication of said coolant fluid outlet of said tool post with said elongate coolant channel of said multiple machine tool support block.

17. The coolant supplying multiple machine tool support system of claim 10, comprising:
- a machine tool mounting block having a dove-tail mount adapted for clamping engagement with said dove-tail mount of said multiple machine tool support block; and
- a machine tool clamp block being mounted to said machine tool mounting block and defining a machine tool receptacle, said machine tool clamp block being adjustable relative to said machine tool mounting block to achieve minute adjustment of the position of a machine tool being received within said machine tool receptacle.

18. The coolant supplying multiple machine tool support system of claim 17, comprising:
- positioning pin openings being defined by said machine tool mounting block and said machine tool clamp block; and
- a positioning pin being received in loose fitting relation within said positioning pin openings and permitting slight rotational and omnidirectional lateral positioning of said machine tool clamp block relative to said machine tool mounting block for minute adjustment of the position of a machine tool secured within said machine tool receptacle.

* * * * *